United States Patent [19]

Faye et al.

[11] Patent Number: 5,129,743
[45] Date of Patent: Jul. 14, 1992

[54] ANTIFRICTION BEARING ASSEMBLY SPEED SENSOR

[75] Inventors: Bradley D. Faye, Goshen; James A. Hilby, Watertown, both of Conn.; Denis Alff; Christian Hajzler, both of Annecy, France

[73] Assignee: The Torrington Company, Torrington, Conn.

[21] Appl. No.: 794,559

[22] Filed: Nov. 19, 1991

Related U.S. Application Data

[62] Division of Ser. No. 736,676, Jul. 26, 1991, which is a division of Ser. No. 562,502, Aug. 2, 1990, abandoned, which is a division of Ser. No. 422,218, Oct. 16, 1989, Pat. No. 4,960,333.

[51] Int. Cl.⁵ .................. F16C 33/30; G01P 3/48
[52] U.S. Cl. .................. 384/448; 310/168; 324/173; 324/207.25
[58] Field of Search .................. 384/448, 446, 624; 310/168; 324/173, 174, 207.25

[56] References Cited

U.S. PATENT DOCUMENTS

| | | | |
|---|---|---|---|
| 3,719,841 | 3/1973 | Ritsema | 310/168 X |
| 4,090,592 | 5/1978 | Jovick et al. | 310/168 X |
| 4,092,053 | 5/1978 | Riegler et al. | 384/448 |
| 4,612,501 | 9/1986 | Costello | 324/207.25 X |
| 4,865,468 | 9/1989 | Kato et al. | 384/448 |

Primary Examiner—Thomas R. Hannon
Attorney, Agent, or Firm—Michael H. Minns; John C. Bigler

[57] ABSTRACT

An antifriction bearing assembly comprises a stationary outer race and a rotatable inner race with two annular rows of rolling elements between the races. A sensor assembly is mounted in the outer race so as to position a sensor between the races and the two rows of rolling elements, and an encoder is mounted on the inner race between the rows of rolling elements. Several sensor assembly and encoder configurations are included.

5 Claims, 10 Drawing Sheets

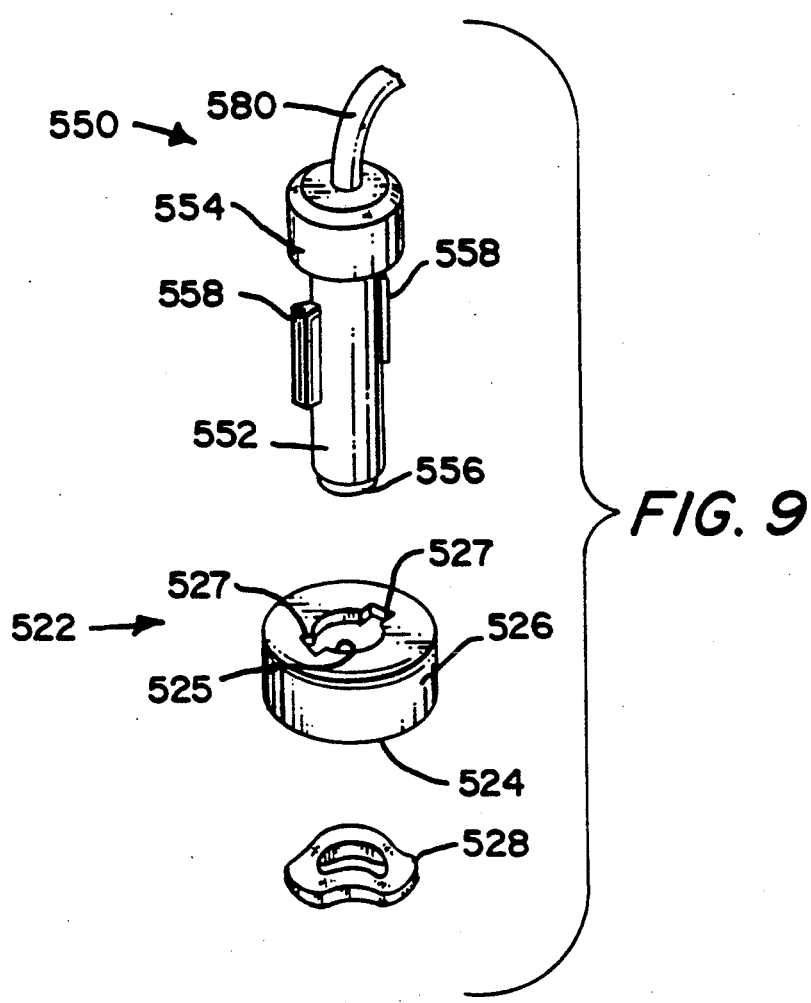
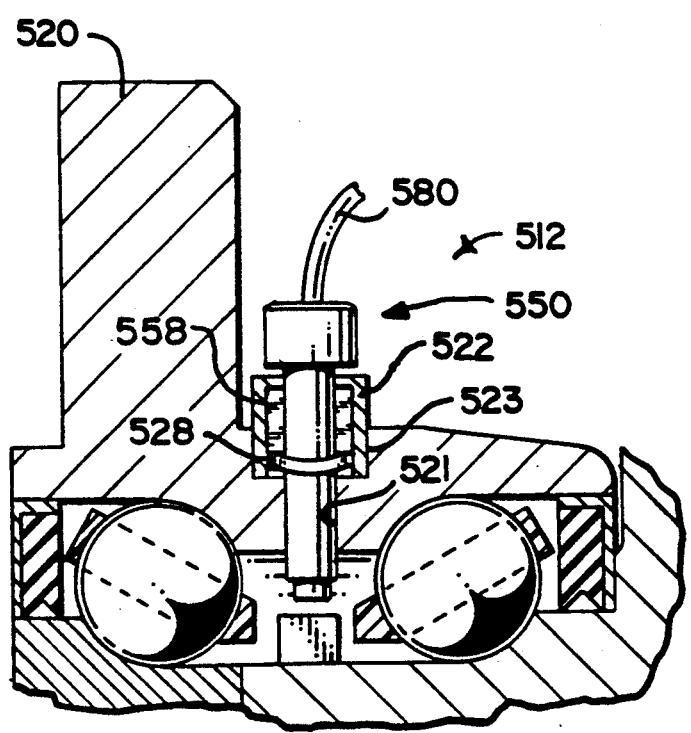
FIG. 9
FIG. 8

ANTIFRICTION BEARING ASSEMBLY SPEED SENSOR

This is a division of application Ser. No. 736,676 filed July 26, 1991, which is a division of application Ser. No. 562,502, abandoned filed Aug. 2, 1990, which is a division of application Ser. No. 422,218 filed Oct. 16, 1989 U.S. Pat. No. 4,960,333.

BACKGROUND OF THE INVENTION

This invention relates to an antifriction bearing assembly having a speed sensing system that produces an output signal. More specifically, it relates to an antifriction bearing assembly speed sensor for use with a rotatable shaft whose speed can be controlled through a feedback system utilizing the speed signal as a basic input to the feedback system. This invention is especially well-suited for use with an automobile wheel bearing in order to provide a speed signal to, for example, an anti-lock braking system or a traction control system.

It is a goal of the automotive industry to manufacture such bearings in a manner which protects the speed sensor and an associated encoder, as well as any rolling elements, from the environment, e.g., from water, dust, and road debris. One way to effectively do this is to position the encoder between two annular rows of rolling elements and then position the sensor assembly so as to be aligned with the encoder.

An example of prior art which does this is U.S. Pat. No. 3,793,545 for a "Speed Sensing Apparatus" issued to Heinz Leiber et al on Feb. 19, 1974. Leiber et al disclose a connecting housing (7) which is screwed into an axle housing (1) so as to be aligned with a rotor ring (3) pressed onto a drive shaft (2)—see FIG. 3, especially.

Another example of the prior art is U.S. Pat. No. 4,778,286 for a "Bearing Assembly" issued to Satoshi Kadokowa on Oct. 18, 1988. In FIG. 1, Kadokawa discloses a bearing assembly having a pulser gear (50) positioned in an annular gap defined by an annular member (16) and the end surface of the shoulder of the body (14). A sensor (60) is inserted in a through-hole One of the main problems with the prior art is that the encoder is positioned in such a manner that it must carry a substantial axial load; therefore, the encoder must be made with a strong material capable of withstanding these forces.

SUMMARY OF THE INVENTION

The total cost of a bearing assembly can be minimized by using an encoder made of softer materials, e.g., a synthetic resin ring having magnetized particles embedded in the ring.

The bearing assembly of the present invention provides encoder configurations and placement which are conducive to the use of these less expensive encoder materials. In addition, several improved means for positioning the sensor assembly in the outer race are also included.

Briefly described, the bearing assembly of the present invention comprises a stationary race and a rotatable race with two rows of rolling elements between the races. An encoder is mounted on the rotatable race in a manner which minimizes any forces acting on the encoder. A sensor assembly is mounted in the stationary race so as to protect the encoder, sensor assembly, and rolling elements from the environment. In addition, the sensor assembly is designed to be easily removable for servicing and replacement.

BRIEF DESCRIPTION OF THE DRAWING FIGURES

The invention may be better understood by reference to the following detailed description and drawings in which:

FIG. 8 is a sectional view of a bearing assembly similar to FIG. 6, except that the sensor assembly is mounted in the outer race in an alternate manner;

FIG. 9 is an exploded view of the sensor assembly, collar, and washer shown in FIG. 8;

In the various figures, like parts are referred to by like numbers.

DETAILED DESCRIPTION

Figure 1:
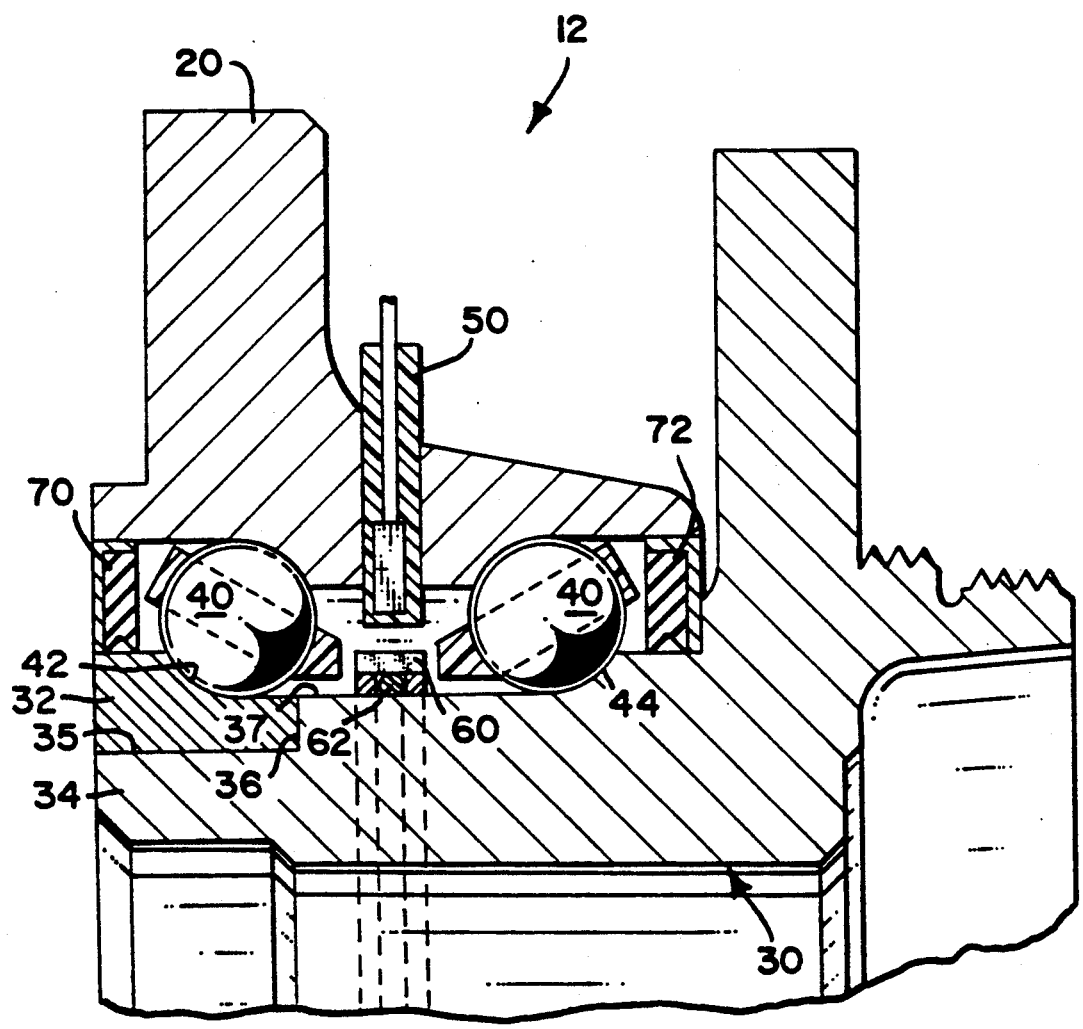
FIG. 1 is a sectional view of a bearing assembly having a sensor assembly and an encoder mounted on an inner race between two rows of rolling elements, with the encoder being mounted on an O-ring which is press-fit onto the inner race.

The bearing assembly 12 shown in FIG. 1 comprises an outer race 20 which is stationary relative to a rotatable shaft (not shown) on which the bearing assembly is mounted, an inner race 30 which is mounted on the rotatable shaft and is therefore rotatable relative to outer race 20, two annular rows of rolling elements 40, a sensor assembly 50, an encoder 60, an O-ring 62, two seals 70 and 72, and a retainer or cage 46 for each row of rolling elements 40. Inner race 30 has a first member 32 and a second member 34. This dual structure facilitates loading the rolling elements 40 between races 20 and 30. First member 32 has a first inner raceway 42 on its outer surface. Second member 34 has a first axial portion 35, a second axial portion 37, a first shoulder 36 formed at the junction of axial portions 35 and 37, and a second inner raceway 44 on the outer surface of axial portion 37.

Encoder 60 has an annular groove in its inside periphery and is mounted on O-ring 62 which is press-fit onto second axial portion 37 of the inner race 30. The resilient O-ring 62 is located in the annular groove in the encoder 60. This allows the dimensional tolerances for the encoder to be substantially relaxed, since the O-ring is resilient and will therefore compensate for a relatively wide range of diameters for the encoder 60. The O-ring 62 also limits axial motion of the encoder, thus ensuring axial alignment with sensor assembly 50. Seals 70 and 72 protect the encoder 60, sensor assembly 50, and the rolling elements 40 from the environment, and they can function to keep grease in the vicinity of the rolling elements for better lubrication.

Figure 2:
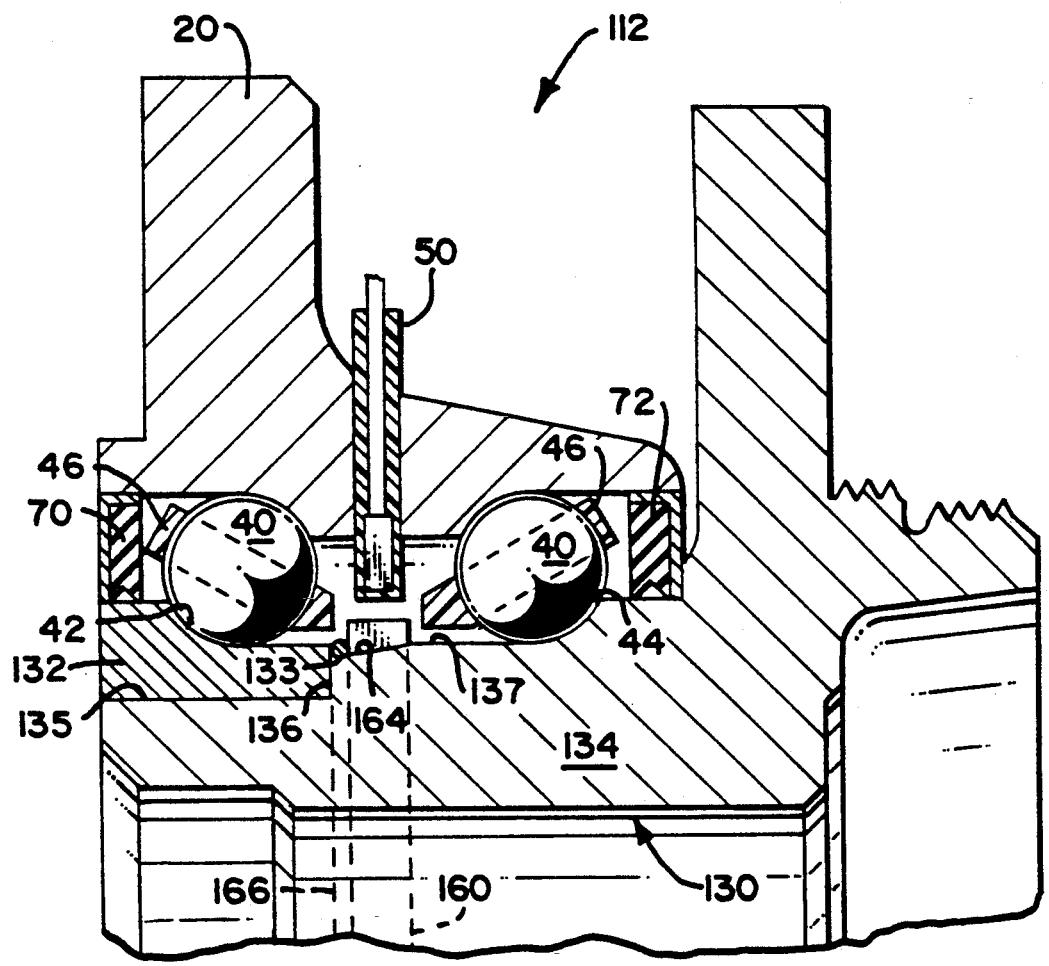
FIG. 2 is a sectional view of a bearing assembly similar to FIG. 1, except that the portion of the inner race on which the encoder is mounted is recessed to provide means for limiting axial movement of the encoder.

Turning now to FIG. 2, a bearing assembly 112 is quite similar to bearing assembly 12 in FIG. 1. The only differences revolve around the manner in which an encoder 160 is mounted on inner race 130. Second axial portion 137 of second member 134 of inner race 130 has a tapered recessed area 164 which exposes a portion 133 of the axial end of inner race first member 132. This portion 133 of first member 132 extends radially outwardly farther than the outer surface of tapered area 164. Encoder 160 can abut the axial end of this outer portion 133, or encoder 160 can abut a support ring 166 which is juxtaposed with the axial end of outer portion 133. Thus, axial motion of encoder 160 is limited by support ring 166 and outer portion 133, or by outer portion 133 alone. It should be noted that he tapered recessed area 164 allows encoder 160 to be manufactured with a looser tolerance, since any variation in the encoder diameter can be relatively easily compensated for when the encoder is slid onto tapered area 164.

Figure 3:
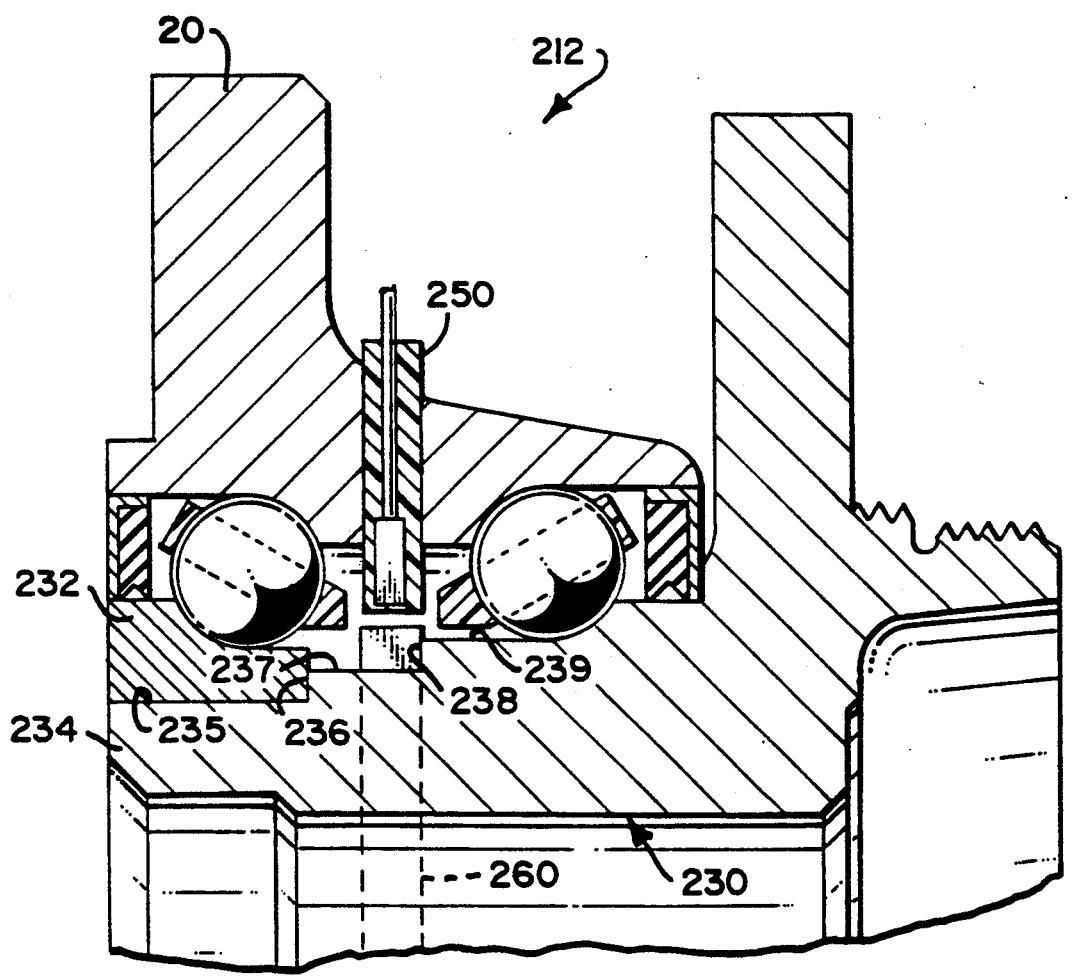
FIG. 3 is a sectional view of a bearing assembly similar to FIG. 2, except that the inner race has a raised portion providing a shoulder to limit axial motion of the encoder.
Figure 4:
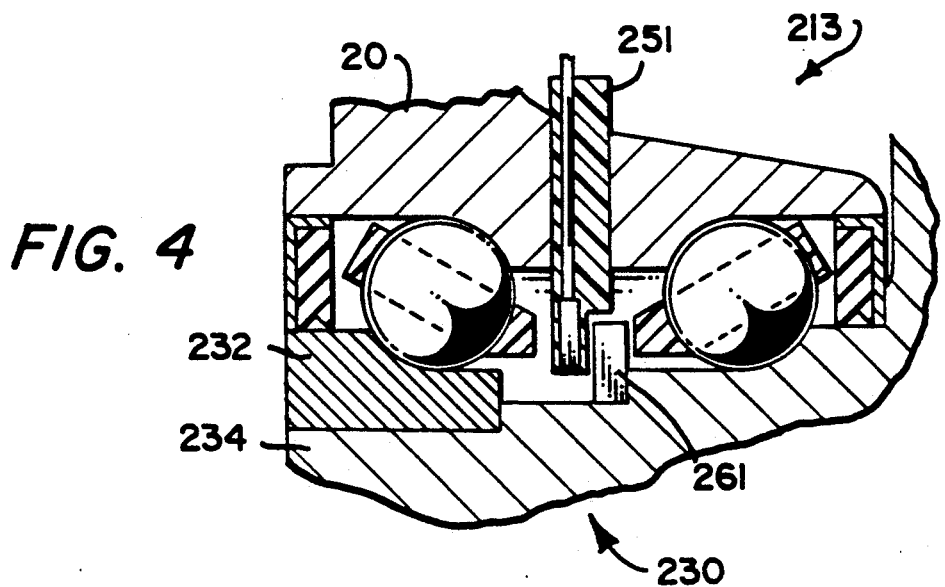
FIG. 4 is almost identical to FIG. 3, except that the encoder and sensor are separated axially rather than radially.

Turning now to FIGS. 3 and 4, bearing assemblies 212 and 213 are similar to bearing assembly 12 in FIG. 1, except that their inner race 230 has an additional portion—third axial portion 239. A second shoulder 238 is formed at the junction of axial portions 237 and 239. Encoders 260 and 261 are mounted directly on second axial portion 237 of inner race 230, and the axial movement of the encoders is limited by the second shoulder 238. In FIG. 3, encoder 260 and sensor assembly 250 are separated radially, whereas in FIG. 4, encoder 261 and sensor assembly 251 are separated axially.

Figure 5:
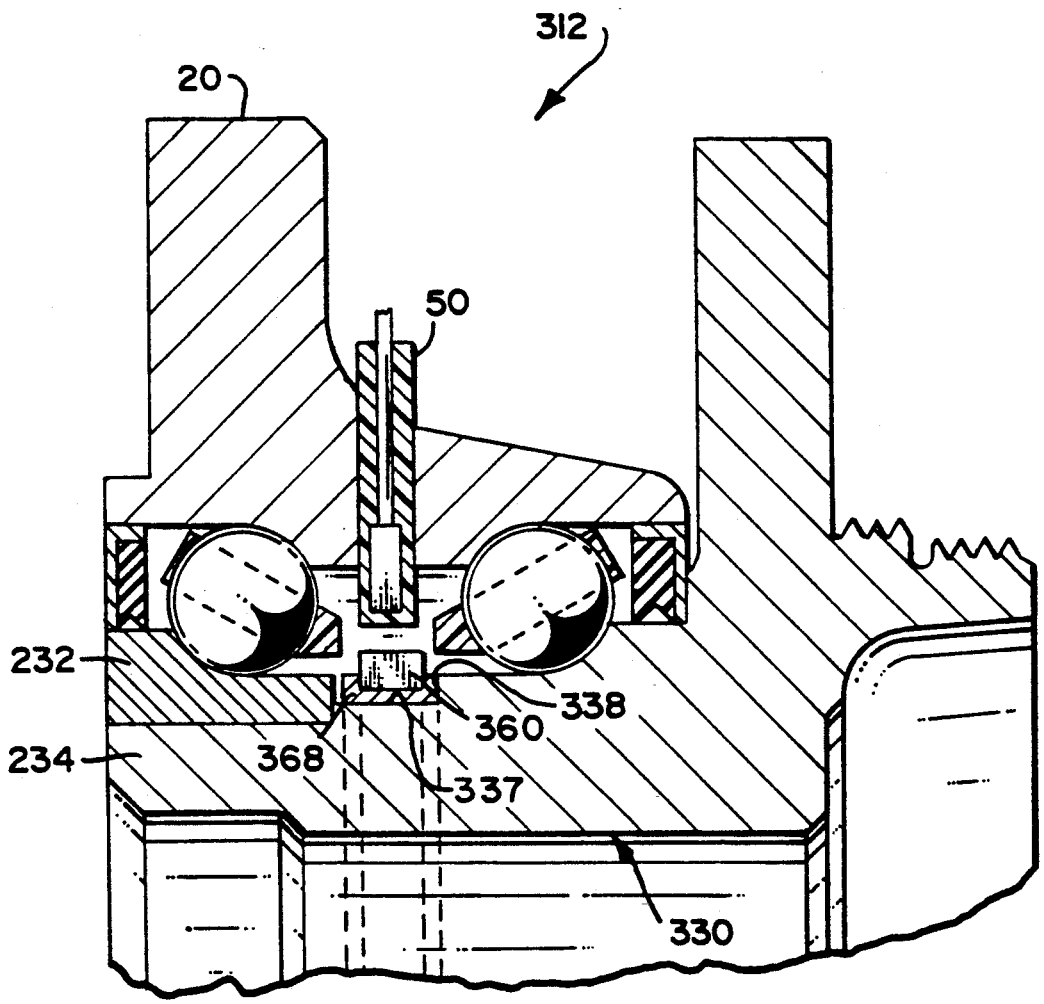
FIG. 5 is a sectional view of a bearing assembly similar to FIG. 3, except that the encoder is positioned on a mounting ring which is press-fit onto the inner race.

Turning now to FIG. 5, a bearing assembly 312 is very similar to bearing assembly 212 in FIG. 3. The only difference between assemblies 212 and 312 is that an encoder 360 in FIG. 5 is affixed to an annular mounting ring 368 which has a C-shaped cross-sectional and is press-fitted onto second axial portion 337 of inner race 330. Ring 368 abuts second shoulder 338, thereby limiting axial movement of the encoder 360. In addition, ring 368 can be made from a resilient material, thus allowing encoder 360 to be manufactured with looser tolerances, e.g., diameter.

Figure 6:
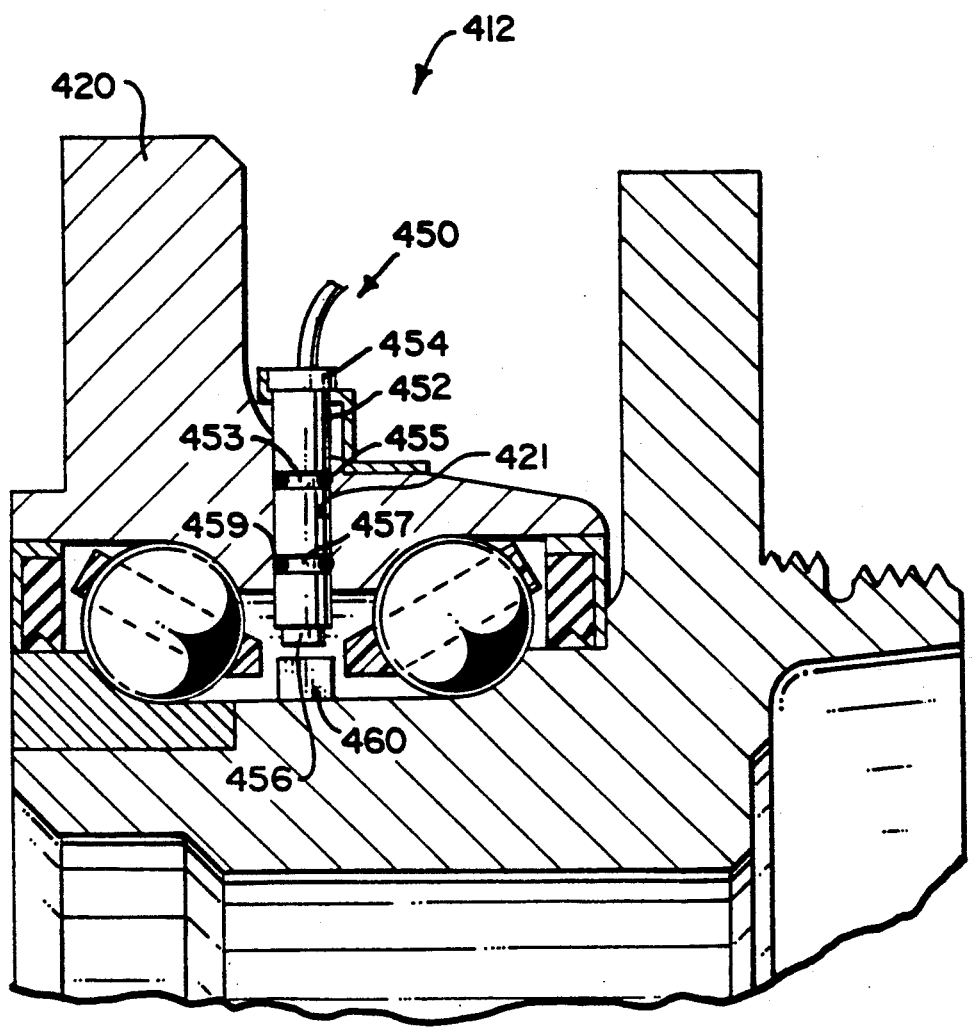
FIG. 6 is a sectional view of a bearing assembly similar to FIG. 1, except that the sensor assembly is mounted in the outer race in a unique manner.
Figure 7:
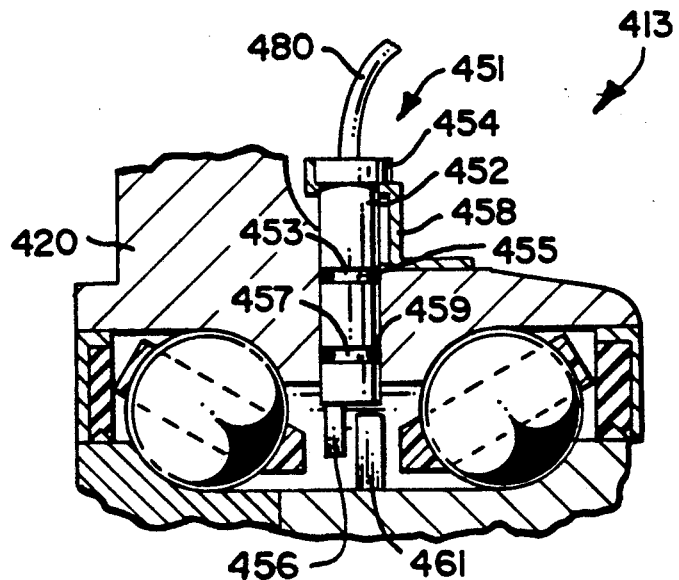
FIG. 7 is identical to FIG. 6, with the one exception that the encoder and sensor are axially separated, rather than being radially separated.

Turning now to FIGS. 6 and 7, bearing assemblies 412 and 413 illustrate an improved means for mounting sensor assemblies 450 and 451 in an outer race 420. A radial bore 421 penetrates outer race 420. Sensor assemblies 450 and 451 each comprise a body portion 452, a head portion 454, and a sensor or detector 456. An output signal lead 480 is connected to sensor assemblies 450 and 451, and body portion 452 has two annular grooves 453 and 457 in which two O-rings 455 and 459, respectively, are located. Body portion 452 is inserted in bore 421 and held in place by a support ring 458 which has a hole in which body portion 452 fits. Similar to FIGS. 3 and 4, the primary difference between FIGS. 6 and 7 is that sensor assembly 450 and encoder 460 are radially separated in FIG. 6, while sensor assembly 451 and encoder 461 are axially separated in FIG. 7.

Turning now to FIGS. 8 and 9, a bearing assembly 512, similar to bearing assembly 412 in FIG. 6, has a sensor assembly 550 comprising a body portion 552, a head portion 554 with an output signal lead 580 connected to it, and a sensor or detector 556. Body potion 554 is inserted into a radial bore 521 which penetrates an outer race 520. Bore 521 has a counterbore 523 in its radially outward end. A collar 522 is press-fitted into the counterbore 523 to provide a housing for sensor assembly 550. Collar 522 has an open end 524 and a closed end 526. Open end 524 is positioned at the inner end of counterbore 523, and closed end 526 has an aperture 525 which has multiple keyways 527 extending radially outwardly from aperture 525. The aperture is sized to accommodate body portion 554 of the sensor assembly which has multiple keys 558 projecting radially outwardly from body portion 554. Before body portion 554 is inserted through aperture 525, it is rotated so that keys 558 are aligned with keyways 527. The keys are then inserted through the keyways, and body portion 554 is rotated so as to misalign the keys and keyways, thereby locking the sensor assembly 550 into the bore 521 and collar 522. A curved washer 528 is positioned at the inner end of counterbore 523 so that the keys 558 press down on the washer when the sensor assembly is locked into collar 522. Washer 528 thus provides a force against the keys so as to ensure positive locking of the sensor assembly in the collar.

Figure 11:
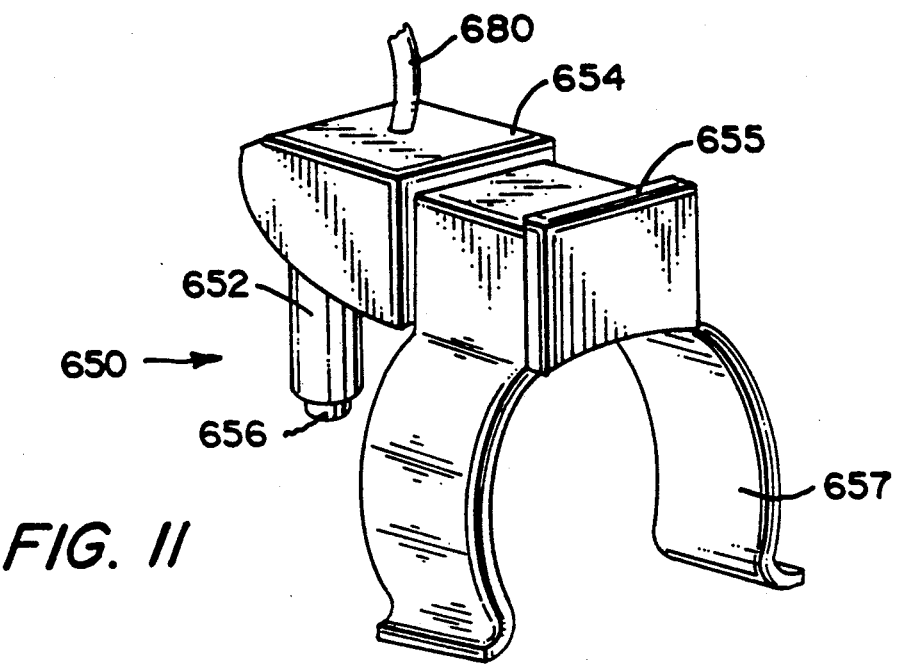
FIG. 11 is a perspective view of the sensor assembly and C-ring shown in FIG. 10.
Figure 10:
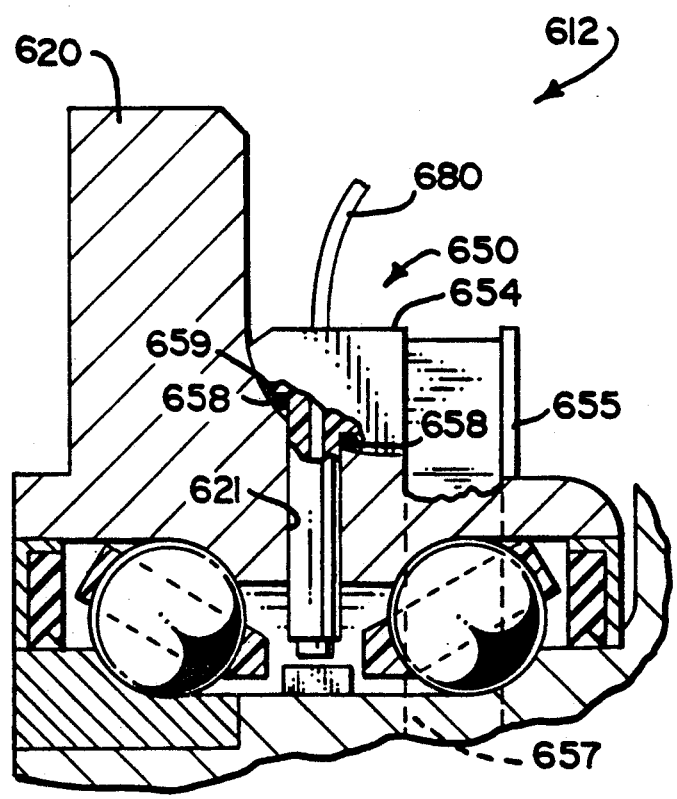
FIG. 10 is a sectional view of a bearing assembly similar to FIG. 6, except that the sensor assembly is mounted in the outer race in another alternate manner.

FIGS. 10 and 11 illustrate a bearing assembly 612 which is somewhat similar to bearing assembly 412 shown in FIG. 6. Bearing assembly 612 depicts another means for mounting a sensor assembly in the outer race. Sensor assembly 650 is inserted into a radial bore 621, and comprises a body portion 652, a head portion 654, and a sensor 656. Head portion 654 has a saddle portion 655 which accommodates a C-ring 657 which clips onto the outer.surface of outer race 620. As can best be seen in FIG. 10, head portion 654 has an arcuate inner surface which exactly matches the curved outer surface of outer race 620, so that portion 654 makes a flush fit with the outer surface. An O-ring 658 around the outer end of bore 621 is seated in an annular groove 659 in the inner surface of head portion 654 so as to protect the sensor, encoder, and roller elements from the environment.

Figure 12:
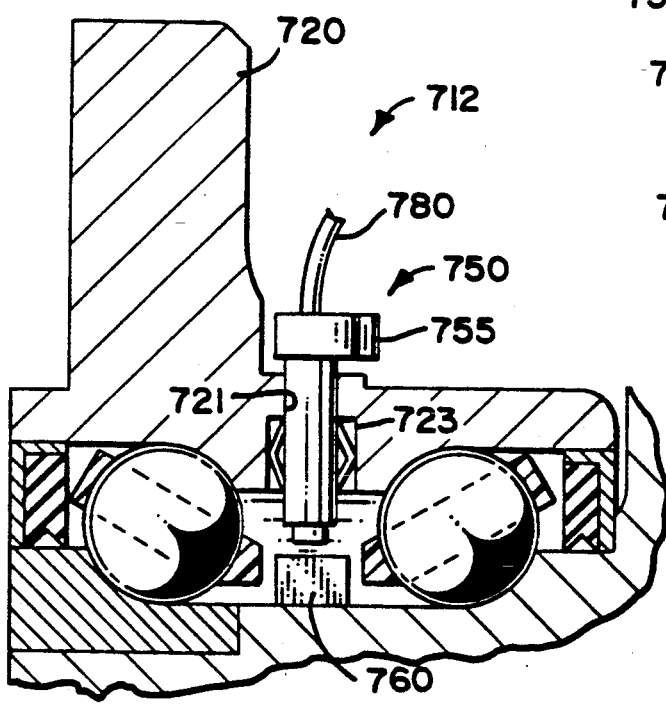
FIG. 12 is a sectional view of a bearing assembly illustrating a modified sensor assembly mounting configuration.
Figure 13:
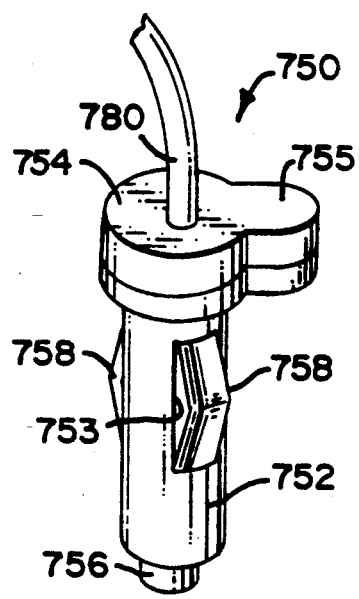
FIG. 13 is a perspective view of the sensor assembly in FIG. 12.

Turning now to FIGS. 12 and 13, a bearing assembly 712 is similar to bearing assembly 512 in FIG. 8. A radial bore 721 in outer race 720 has a counterbore 723 in its inner end. Sensor assembly 750 has a body portion 752, a sensor 756, and a head portion 754 with an axially-extending portion 755 providing means for prying assembly 750 out of the bore 721 for servicing or replacement. Body portion 752 has multiple radially-oriented elongated slots 753 in its outer surface, and multiple leaf-springs 758 are compressed and inserted into the slots as shown best in FIG. 13. When sensor assembly 750 is inserted into bore 721, the leaf-springs 758 press against the side surface of counterbore 723 in order to positively position the sensor 756 relative to the encoder 760. By prying portion 755 radially outwardly from outer race 720, the leaf-springs can be pressed completely into slots 753 so that body portion 752 of the sensor assembly can be pulled out of radial bore 721.

Figure 14:
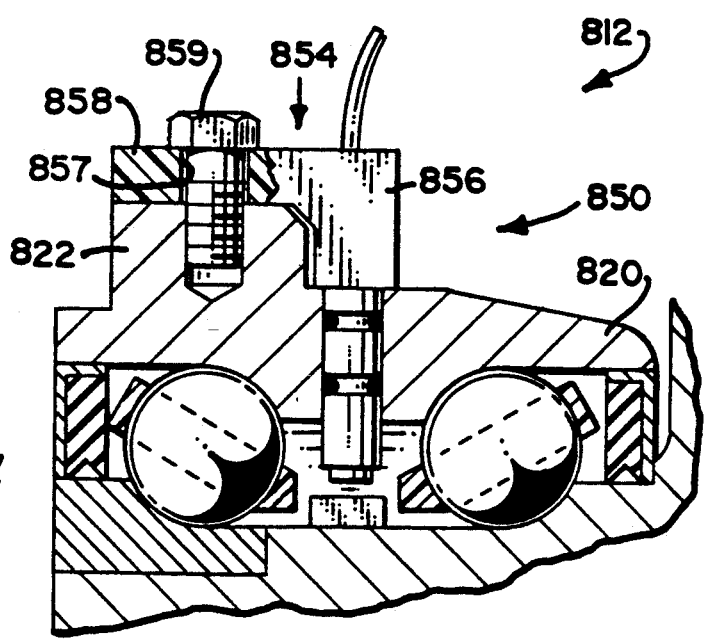
FIG. 14 is a sectional view of a bearing assembly which illustrates still another modification of the means for mounting the sensor assembly in the outer race.

Turning now to FIG. 14, a bearing assembly 812 is almost exactly the same as bearing assembly 412 in FIG. 6. The difference is that L-shaped head portion 854 of sensor assembly 850 has a radial part 856 and an axial part 858. A radial aperture 857 through axial part 858 is sized to receive a fastener 859, such as a bolt, which fastens head portion 854 to the outer race 820. In the example shown in FIG. 14, bolt 859 is attached to a flange 822 projecting radially outwardly from outer race 820; however, axial part 858 may be fastened to any suitable portion of the outer race, as desired.

Figure 15:
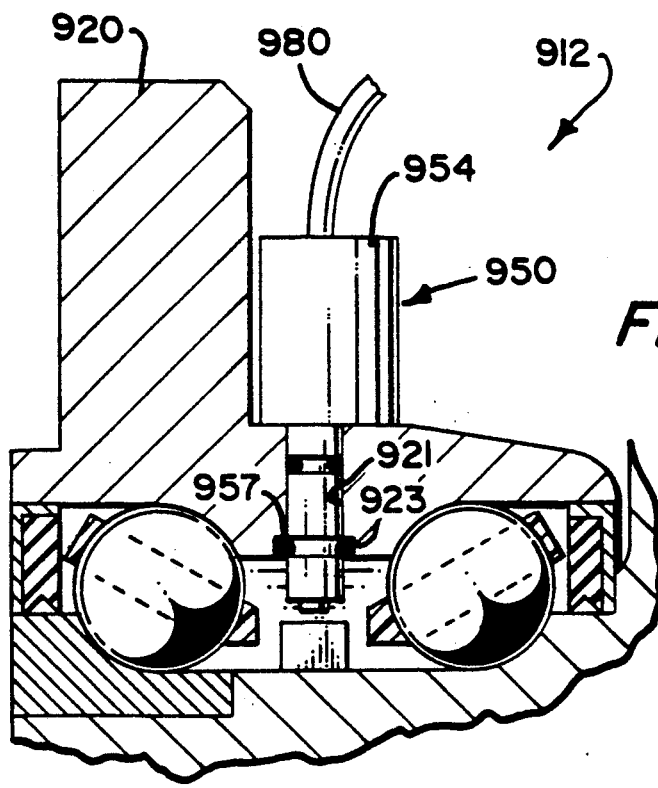
FIG. 15 is a sectional view of a bearing assembly with another modified sensor assembly mounting means which utilizes a counterbore in a bore through the outer race.
Figure 16:
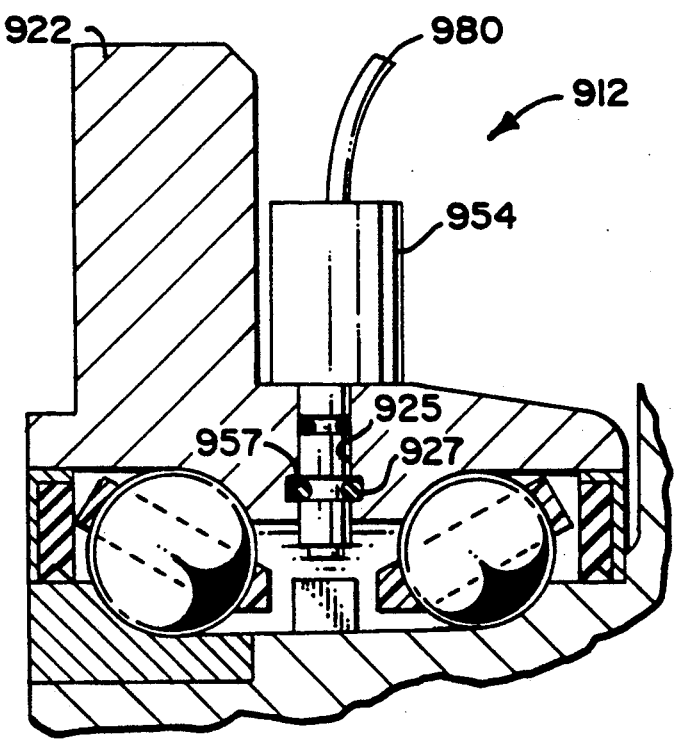
FIG. 16 is a sectional view identical to FIG. 15, except that the counterbore is located in the interior of the outer race, while the counterbore shown in FIG. 15 is located near the inner surface of the outer race.

In FIGS. 15 and 16, bearing assemblies 912 and 913 are also similar to bearing assembly 412 in FIG. 6. The main difference is that the inner O-ring 957 is seated in a counterbore 923 or 927 in radial bore 921 or 925, respectively. In FIG. 15, the counterbore is located at the innermost end of bore 921, while in FIG. 16, the counterbore is located in the interior of outer race 922, intermediate the innermost and outermost ends of radial bore 925. Inner O-ring 957 functions to hold the sensor assembly in the outer race bore.

Figure 17:
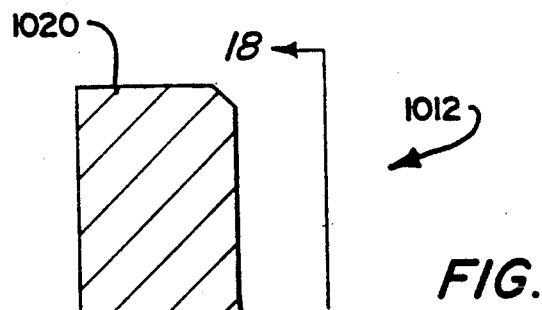
FIG. 17 is a sectional view of a bearing assembly having a uniquely mounted sensor assembly.
Figure 18:
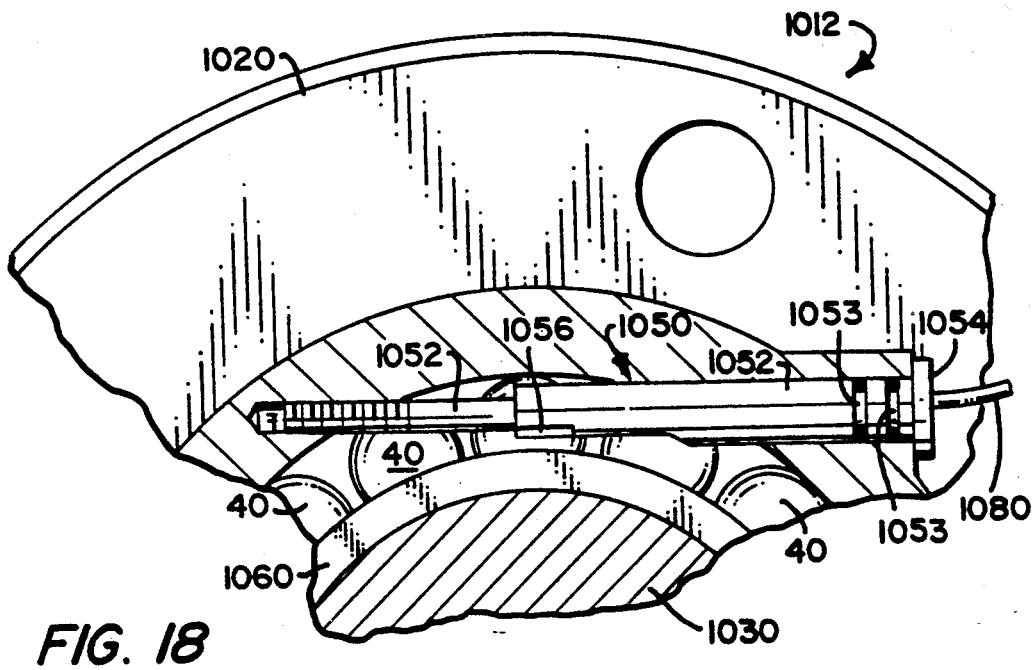
FIG. 18 is an axial view of the same bearing taken along line 18—18 in FIG. 17, illustrating the transverse mounting of the sensor assembly in the outer race.

Finally, turning to FIGS. 17 and 18, a bearing assembly 1012 has a unique mounting for a sensor assembly 1050. The sensor assembly is mounted in a non-radial hole in outer race 1020. Sensor 1056 is aligned with encoder 1060, and two O-rings 1055 seal the encoder, sensor, and roller elements. The O-rings are seated in annular grooves 1053 in the body portion 1052 of the sensor assembly. The body portion is inserted into a non-radial bore 1021 which penetrates two portions of the outer race 1020, as shown in FIG. 18.

We claim:

1. An antifriction bearing assembly mounted on a rotatable shaft, said bearing assembly comprising in combination:
    an outer race which is stationary relative to said shaft, said outer race having an inner surface and an outer surface;
    an inner race which is rotatable relative to said outer race, said inner race being attached to said shaft;
    two annular rows of rolling elements between said inner and outer races;
    an encoder mounted on said inner race between said two rows of rolling elements;
    a sensor assembly having a sensor aligned with said encoder to provide an output signal proportional to the rotational speed of said shaft; and
    means for mounting said sensor assembly in said outer race;
    said means for mounting said sensor assembly in said outer race comprising:
    a radial bore penetrating said outer race, said bore having an outer end and an inner end, said bore also having a counterbore in said outer end, and said counterbore having an inner end and an outer end;
    the sensor assembly further comprising a body portion and a head portion having a diameter larger than said body portion, said body portion having multiple keys extending radially outwardly from said body portion;
    a cup-shaped collar press-fitted into said counterbore, said collar having an open end and a closed end having an aperture therethrough to receive said sensor assembly body portion, said aperture having a keyway to receive each of said keys on said sensor assembly body portion, said closed end of said collar extending radially outwardly from said outer race outer surface, and said open end of said collar being press-fitted into said inner end of said counterbore; and
    a curved washer positioned inside said collar at said inner end of said counterbore, said washer providing force against said sensor assembly keys when said body portion is inserted into said bore and collar, and locked into place when said keys are inserted through said keyways and rotated.

2. An antifriction bearing assembly mountable on a rotatable shaft, said bearing assembly comprising:
    an outer race which is stationary relative to said shaft, said outer race having a radial bore therethrough having an outer end having a counterbore;
    an inner race rotatable relative to aid outer race, said inner race being mountable on said shaft;
    two annular rows of rolling elements between said inner and outer races;
    an encoder mounted on said inner race between said two rows of rolling elements;
    a sensor assembly at least partially within said outer race bore and having a sensor aligned with said encoder to provide an output signal indicative of the rotational speed of said shaft, said sensor assembly also having a keyed body portion;
    keyway means mounted about said counterbore of said outer race for receiving said keyed body portion of said sensor assembly; and
    biasing means engageable with the sensor assembly for biasing said sensor assembly radially outwardly from said outer race such that said keyed body portion is lockable against said keyway means.

3. A bearing assembly according to claim 2, wherein said keyway means is a cup-shaped collar press-fitted into said counterbore, said collar having an open end and a close end having an aperture therethrough corresponding to said keyed body portion, said closed end of said collar extending outwardly from said outer race, and said open end of said collar being press-fitted into said counterbore.

4. A bearing assembly according to claim 2, wherein said sensor assembly has an axis and a head portion extending radially outwardly from said axis beyond the keyed body portion thereof such that said head portion provides a stop surface relative to the keyway means.

5. A bearing assembly according to claim 2, wherein said keyed body portion of said sensor assembly has a generally cylindrical configuration with at least one key extending radially outwardly form the axis of the keyed body portion and wherein said biasing means is a spring mounted in the counterbore of the outer race and engaging said at least one key.

* * * * *